Jan. 15, 1963  J. D. FANN  3,073,151
VISCOMETER

Filed June 15, 1961  3 Sheets-Sheet 1

Inventor
James D. Fann

United States Patent Office 3,073,151
Patented Jan. 15, 1963

3,073,151
VISCOMETER
James D. Fann, Houston, Tex., assignor to Great Lakes Carbon Corporation, New York, N.Y., a corporation of Delaware
Filed June 15, 1961, Ser. No. 117,770
9 Claims. (Cl. 73—54)

This invention relates to a device for measuring the consistency or viscosity of fluids. More particularly, this invention relates to a device for measuring the consistency or viscosity characteristics of fluids at different pressures and temperatures, and is particularly adaptable to measuring the changes in consistencies or viscosities of fluids which undergo a chemical reaction or physical change depending upon the pressure and temperature of the fluid, or on changes in the pressure and temperature, or on the length of time that the fluid is subjected to different or varying pressures and/or temperatures.

While the present invention is not so limited, it is particularly well adapted to measuring the viscosity characteristics of fluid materials commonly used in the oil and gas industry. In connection with the drilling of oil and gas wells, a variety of fluid compositions are subjected to elevated pressures and temperatures which occasionally cause rapid increases in the viscosity of such fluid compositions which are pumped into the well bores. In the completion of such wells, it is common practice to pump a cementitious slurry down into the well through casing, and force this slurry up through the annulus between the casing and the well bore. This operation is designed to seal off the overlying formations from the oil or gas producing zone with set cement. It is common knowledge that a slurry of Portland cement, with or without aggregates or other additives contained therein, tends to thicken and occasionally "flash set" in the well in a relatively short period of time. The deeper the well, the higher generally will be the temperature and pressure to which the cement slurry is subjected and these conditions aggravate the setting problem.

In view of the foregoing facts, there has been a great need for a device or an apparatus and a method capable of measuring the changes in viscosities of Portland cement slurries and other fluids which will be subjected to varying temperature and pressure conditions in wells, as well as, or alternatively capable of measuring the time intervals required to reach various consistencies or viscosities under varied temperature and pressure conditions. These conditions may, for example, vary from atmospheric pressure to eighteen thousand lbs./sq. inch and from 80° to 400° F. To accomplish the foregoing objectives it is desirable to simulate well conditions as closely as possible. A typical time-pressure-temperature well-simulation schedule for cementing casing for a 14,000 foot well is as follows:

| Time (Min.) | Pressure (p.s.i.) | Temperature (° F.) |
|---|---|---|
| 0 | 1,750 | 80 |
| 2 | 2,030 | 83 |
| 4 | 2,310 | 86 |
| 6 | 2,580 | 89 |
| 8 | 2,860 | 92 |
| 10 | 3,140 | 95 |
| 12 | 3,420 | 98 |
| 14 | 3,700 | 101 |
| 16 | 3,970 | 104 |
| 18 | 4,250 | 107 |
| 20 | 4,530 | 110 |
| 22 | 4,810 | 113 |
| 24 | 5,090 | 116 |
| 26 | 5,370 | 119 |
| 28 | 5,650 | 122 |
| 30 | 5,920 | 125 |
| 32 | 6,200 | 128 |
| 34 | 6,480 | 131 |
| 36 | 6,760 | 134 |
| 38 | 7,040 | 137 |
| 40 | 7,320 | 140 |
| 42 | 7,600 | 143 |
| 44 | 7,880 | 146 |
| 46 | 8,160 | 149 |
| 48 | 8,440 | 152 |
| 50 | 8,710 | 155 |
| 52 | 8,990 | 158 |
| 54 | 9,270 | 161 |
| 56 | 9,550 | 164 |
| 58 | 9,830 | 167 |
| 60 | 10,110 | 170 |
| 62 | 10,390 | 173 |
| 64 | 10,670 | 176 |
| 66 | 10,950 | 179 |
| 68 | 11,230 | 182 |
| 70 | 11,500 | 185 |
| 72 | 11,780 | 188 |
| 74 | 12,060 | 191 |
| 76 | 12,340 | 194 |
| 78 | 12,620 | 197 |
| 80 | 12,900 | 200 |
| 82 | 13,180 | 203 |
| 84 | 13,390 | 206 |

The instrument herein described is suitably adapted to closely simulate the foregoing time-pressure-temperature schedule as well as similar schedules.

Certain forms of apparatus have been devised by others to measure the changes in viscosity or consistency of Portland cement slurries under controlled time-pressure-temperature conditions. These devices generally, however, are very expensive and physically quite cumbersome. They are normally retained in regional laboratories where consistency tests are made. It is, however, desirable to have a portable consistometer which can satisfy the foregoing needs and which can be used on the well site to measure what the viscosity characteristics of cement slurry samples taken directly from cement trucks just prior to the pumping of the cement slurry into the well for cementing casing are likely to be.

The devices which have heretofore been used for testing cements, besides possessing the aforedescribed shortcomings, are further provided with paddles, agitators or similar means which continuously stir the cement slurry or other well fluid in the testing apparatus over a desired time-pressure-temperature testing cycle. When friable materials such as lightweight aggregates which are often used for lowering the weight of cement slurry and/or for sealing or bridging off certain areas in the subterranean formation are incorporated into the cement slurry, these internal mixing devices tend to degrade or abrade such materials and this will affect the viscosity and setting time of the cement slurry. Therefore, conventional laboratory devices currently in use cannot give a truly accurate prediction of the viscosity changes, and the times required for same for cement-aggregate slurries under actual well conditions.

The apparatus of the present invention is capable of satisfying the foregoing described needs—and without incurring said shortcomings. The apparatus of the present invention is also adaptable for general studies of changes in viscosity of oil well drilling fluids under varying conditions of pressure and temperature. It is also useful in the testing of fluid compositions which are not necessarily connected with the drilling and completion of oil and gas wells. For example, the apparatus of the present invention is adaptable to measuring the viscosities of such materials as lubricants, whether these be of petroleum base or some other base material, liquid foodstuffs such as syrups, molasses, anti-freeze solutions, etc., and the time required for the viscosities of such materials to change from one predetermined value to another predetermined value at temperatures and pressures either above or below usually prevailing atmospheric conditions.

It is, therefore, an object of the present invention to provide an apparatus and a method for measuring the consistency or viscosity of fluids at high or low pressures and temperatures. Another object of the present invention is to provide an apparatus for measuring the viscosity, at any particular time or during any time interval, of fluids which are characterized by undergoing chemical or physical reaction or change, depending upon changing conditions of time, pressure and temperature. It is a further object of the present invention to provide an apparatus or device as well as a method for measuring the time intervals required to reach various viscosities of fluids which are characterized by undergoing chemical or physical reaction or change, depending upon changing conditions of time, pressure and temperature. It is a further object of the present invention to provide a device which will achieve the foregoing objects with fluids which contain friable materials suspended therein and in which the degrading of such materials is minimized or substantially eliminated.

Further objects and advantages of the present invention will be apparent from the following detailed description particularly when considered in conjunction with the accompanying drawings.

In general, the invention comprises a substantially non-magnetic cylindrical container for the fluid to be tested, electromagnetic windings surrounding upper and lower portions of a cavity or well in said container for establishing magnetic fields in said portions of said container, means having an appreciable viscous drag and being responsive to said fields positioned within said container and freely movable in the fluid, means for intermittently and regularly electrically energizing said windings whereby said electromagnetically responsive movable means is caused to move into the resultant respective magnetic fields and move toward the top and bottom surfaces of the cavity of said container, surfaces at both the top and bottom of said cavity which generate and transmit sound waves when struck by said movable means, means for converting said sound waves into electrical signals, means for amplifying said electrical signals, and improved, elaborate and highly efficient means for sensing the viscosity of the fluid being tested and for recording same, said latter means being the main subject matter of this invention, comprising several stages, and described in full hereinafter.

The foregoing described general embodiment of the present invention will become better understood after the attached drawings are studied in detail.

Figure 1:
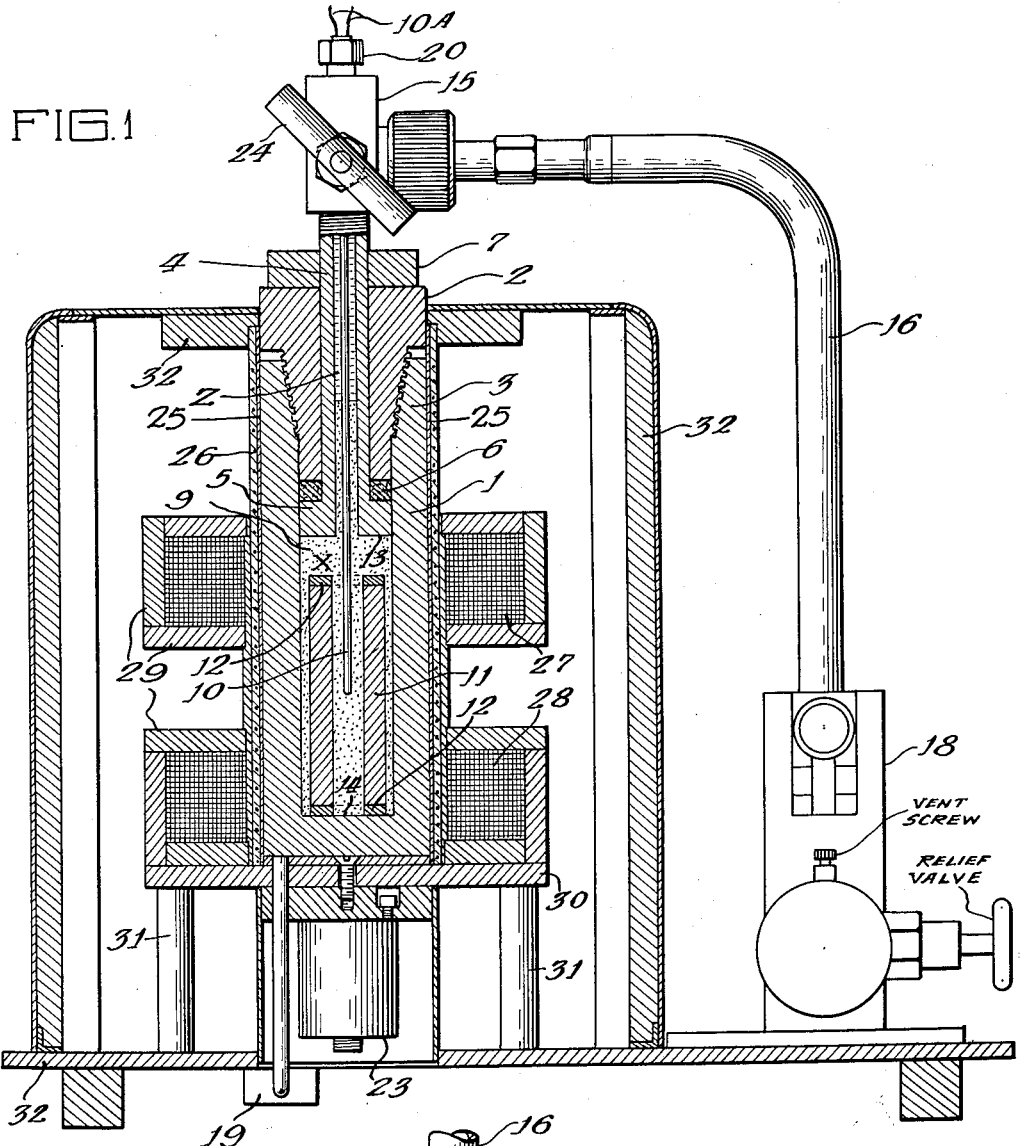
FIGURE 1 shows a perspective view of the fluid receiving vessel and associated elements employed in the present invention with most of the features shown in cross-section, and certain other features being represented schematically or diagramatically.

Referring therefore to the drawings and particularly FIGURE 1, there is shown a pressure cell or container 1 which is constructed of a non-magnetic material capable of withstanding high pressures and also capable of conducting sound and heat. Stainless steel, brass and Monel metal are typical satisfactory materials. The container is provided with a fluid-tight, sound-conductive, pressure-withstanding plug or closure 2. This plug or closure 2 is threaded into the top inner threaded, tapered part 3 of the container. The center of the plug or closure 2 is hollow and cylindrical in shape. A pressure inlet stem or tube 4 made of a magnetic material extends through this hollow center of the plug. The bottom 5 of the pressure inlet stem 4 is flanged. Between the top part of this flange and the bottom of the plug or closure 2 is placed a sealing gasket 6 which may be made from a resilient and temperature-resistant material such as Teflon. Teflon is a registered trademark of the E. I. duPont de Nemours and Company for a plastic material consisting of a tetrafluoroethylene polymer. A pressure seal nut 7 is threaded around a threaded portion of the pressure inlet stem 4 until the upward motion of the flange 5 of the inlet stem causes the sealing gasket 6 to form an initial pressure seal. Any further pressure exerted on the contents of the container or pressure cell then assists in keeping the cell pressure tight for it simply exerts more force on the flange against the gasket. A bronze or other type thrust washer may, if desired, be placed between the plug 2 and the seal nut 7 to keep them separated and to keep them from locking. Situated within the cavity or well 9 of the container is a thermowell 10 in which is placed wires 10A of an electric thermometer for measuring the temperature of the fluid placed within said central cavity 9. The thermowell extends about halfway down into this main cavity or well of the container. Also situated within the main cavity 9 of the container is an electromagnetically responsive iron plunger or bob 11 which is cylindrical in shape, but hollow at its center. The top and bottom of this iron plunger or bob is preferably made from a resilient material 12 such as neoprene. The iron plunger 11 during the operation of the device is caused to strike the top surface 13 of the main cavity of the container (which is also the bottom of the flange 5 of the pressure inlet stem 4) as well as the bottom surface 14. Both of these surfaces, being metallic, readily generate and transmit sound waves when struck by the bob.

Mechanically coupled and operatively connected to the bottom of cell 1 is a pick-up transducer 23 which typically is a moving coil in a permanent magnet magnetic field tuned to approximately 70 cycles per second.

The top of the pressure inlet stem 4 is threaded into a valve body or block 15. The valve body 15 performs several functions. It serves as a coupling means between an external pressure line 16 and the pressure inlet stem 4. The pressure in this external pressure line, which line has its input or is coupled to the valve body 15 such as by means of threaded bolt 16A and nut 16B shown in FIGURE 2, may be varied by means of a pump 18 acting on a fluid such as oil. A conventional pressure gauge (not shown) may also be in the line to show the pressure at any given moment. A gasket or pressure packing 17, also shown in FIGURE 2, surrounds the pressure line between the valve body 15 and the threaded bolt 16A.

The valve body 15 also supports or contains pressure packing for the pressure inlet stem 4 and thermowell packing for the thermowell 10, as well as thermowell bolt 20.

In operation, and after the bob and a suitable amount of cement have been placed in the cell and the various closures affixed thereto, the pressure line 16 is connected to the valve body 15 making sure valve handle 24 is opened about two or three turns. The pump relief valve is then closed and pumping begun. When clean oil (which is the typical medium employed to exert pressure upon the cement) free of bubbles, begins to overflow from the top of valve block 15, the thermowell 10 is inserted and tightened, the thermometer wires 10A inserted and the pressure brought up to the starting point of the particular time-pressure-temperature schedule to be followed.

After the test has been completed, valve handle 24 may be tightened to force the conical end of valve member 24B to seat into the opening of 24C in order to make the cell pressure tight before removing the external pressure line. This enables rapid cooling of the cell if desired, such as by immersion in water.

The pressure cell having the features and attachments as thus far described is designed for ready insertion in an external chamber or housing possessing several features. A shell or a can 25 immediately surrounds the side walls of the pressure cell. Immediately surrounding the shell or can 25 is a means 26 for heating or cooling the contents of the pressure cell. Typically, and for the main purposes of the instrument, it will be a resistance wire heater. The shell or can 25 may typically be made from a non-magnetic material such as aluminum and serves to support the heating or cooling means and to readily conduct different temperatures to the fluids being tested. External to the heating or cooling means and surrounding same are electromagnet coils 27 and 28 each having a pre-selected number of ampere turns. Soft iron plates 29 are at the top and bottom and side of or surround each of these electromagnets. A soft iron base 30 also supports the cell and the bottom electromagnetic coil and the plates surrounding same. This base rests upon support members 31 which extend up from the bottom of the instrument.

Figure 3:
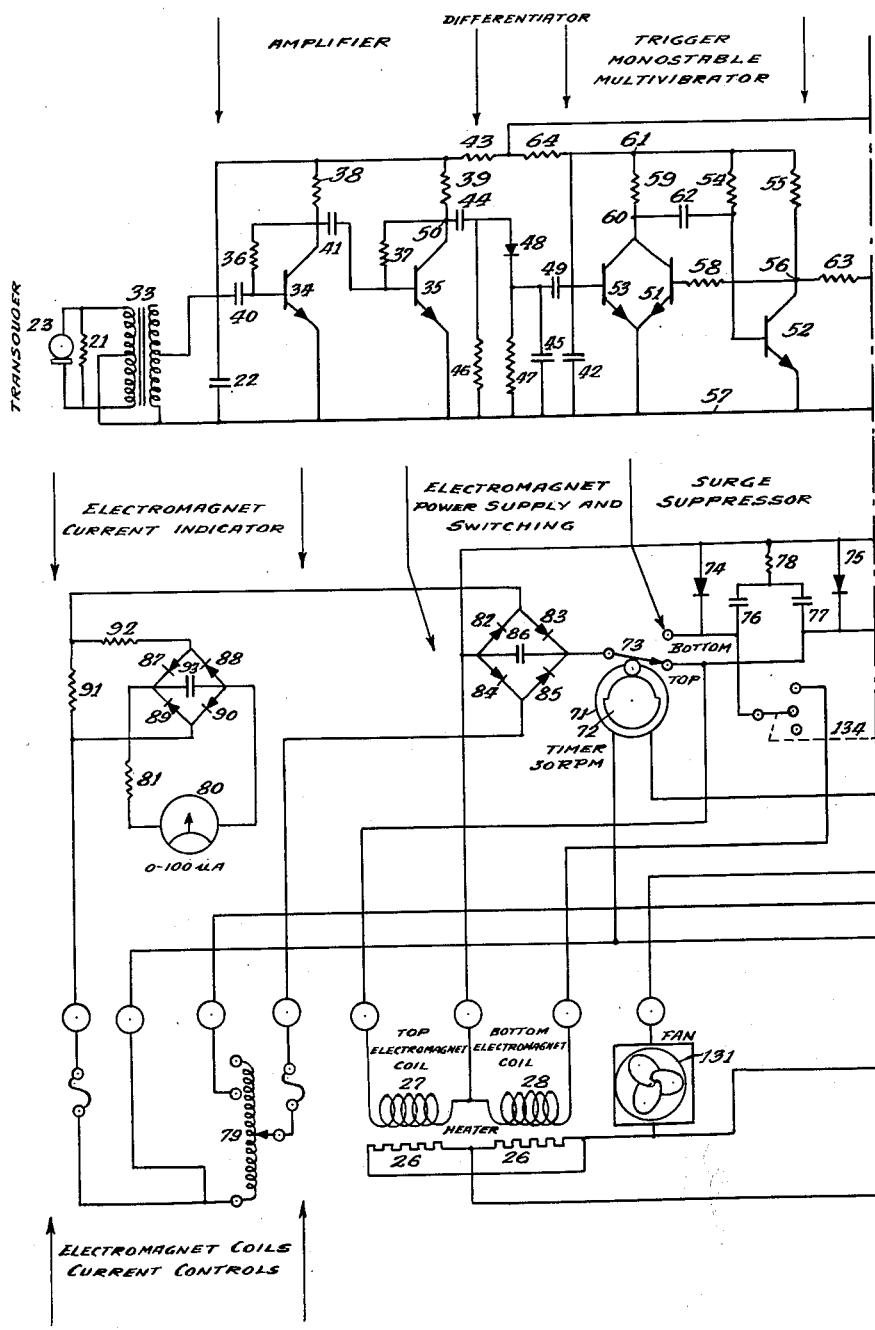
FIGURES 3 and 3A show a schematic diagram of the electrical circuits and various associated mechanical elements which complement the fluid receiving vessel of the present invention.

Situated between these support members and beneath the cell and operatively connected thereto is the transducer 23 which picks up the sounds generated by the bob when it strikes surfaces 13 and 14. This transducer as shown in FIGURE 3 is coupled into a specially designed electronic circuit, which circuitry embodies the essence of this invention and provides the main areas of distinction between the instrument described and claimed in this application from the viscometer instrument described and claimed in my co-pending application S.N. 856,962, filed December 3, 1959, of which the present application is a continuation-in-part. Air-inlet means 19 near the transducer and leading to an annular space around the cell are provided in order to assist in controlling the considerable heat which is generated by the electromagnet coils. Aair at about 20 p.s.i. may be blown into this annular space in order to hold the sample temperature to the desired level. Too much pressure should be avoided as it may tend to float the cell on an air cushion, and diminish or lose the mechanical connection necessary for transmitting signal from the cell to the transducer.

Thermal insulation 32 surrounds the pressure cell at its top and bottom and at its sides in an external box-like chamber especially adapted to house the pressure cell in an efficient as well as attractive manner. The various conventional controls and switches are generally located on the face of this box-like chamber which houses all of the foregoing elements.

Figure 2:
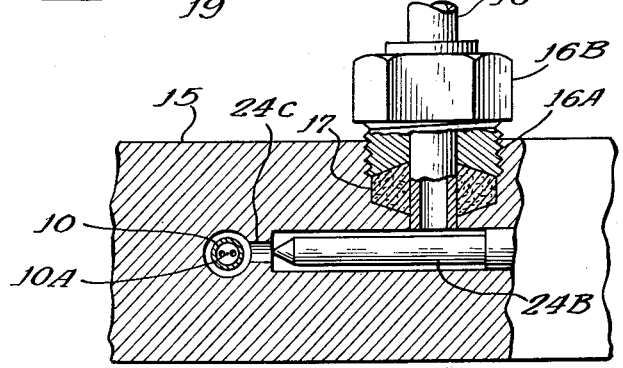
FIGURE 2 is a partial cross-sectional view showing typical pressure supply means and associated features in greater detail than is shown in FIGURE 1.

A specifically designed pressure cell has a main central cavity 1½" in diameter and 5" high. A soft iron bob 11, weighing about 500 grams, displacing 72 cc. of fluid and having an outside diameter of 1¼" and ½" diameter central bore is placed in the cavity after about 76 cc. of the fluid to be tested, such as cement, has been placed therein. This causes the fluid being tested to rise to a height well above the top of the main cavity of the cell and insures that none of the pressure fluid will get into the main cavity. Care should also be taken not to employ too much of the fluid being tested as overfilling will force cement into the valve and hydraulic line. As previously stated, after all the closures and other mechanical elements shown in FIGURES 1 and 2 are properly coupled to the cell 1 and valve body 15, a liquid, such as oil, substantially immiscible with the fluid being tested, is then pumped into the system through the pressure input means 16 and the cell brought to the intitially desired pressure and temperature such as, for example 1750 p.s.i. and 80° F. required to start the test of the cement slurry. In FIGURE 1 the cement slurry is marked "X" and the oil "Z."

In the system shown in FIGURE 1, the energizing of the top 27 and bottom 28 electromagnets or coils sets up electro-magnetic fields through the soft iron portions of the assemblage, including soft iron plates 29, the bob 11 and the flange 5 for the upper winding; and soft iron plates 29, the bob 11, and iron base 30 for the lower winding. The neoprene top 12 of the bob 11 prevents the bob from sticking to the top surface of the cavity.

In the measurement of cementitious fluids such as are used in the oil-well industry, the attainment of viscosities of approximately 20, 70 and 100 poises are recognized as being significant. The arrival or obtainment of a 20-poise viscosity level generally requires the most time and also generally indicates that the viscosity of the cement from that stage on will increase rapidly; the arrival at the 70 poise level signals the upper pumpable viscosity point limit; and 100 poise indicates an unpumpable material. To know when or how long or under what conditions these viscosities can be expected to be reached with a particular cement about to be used is therefore very desirable for it will prevent the using of a cement improper for the particular well conditions encountered. This in turn will prevent needless effort and save much time and money by not using a cement which will prematurely set up.

Several factors or parameters are involved in the design of a pressure cell which will successfully indicate when the cement reaches these viscosity levels. These include the time cycles of the electromagnets, that is, how frequently they are energized and de-energized and for what respective lengths of time; the sample volume and dimension of the cavity; the plunger shape, volume, weight and dimensions; and the strengths of the electromagnets and the relative forces exerted by each. The electromagnetic forces exerted by the coils depend on their number of ampere turns and their magnetic circuits. These determine the flux density which in turn determine the respective forces they exert on the bob.

In conjunction with the system shown in FIGURE 1 means are provided for alternately energizing the top and bottom coils, thirty times per minute each, with the top coil being energized for one second each cycle and the bottom coil being energized for one second each cycle. The top and bottom coils possess approximately 5000 ampere turns. With this arrangement the top coil exerts approximately 1 gravitational pull of force less on the bob than does the bottom coil which is assisted by gravity.

The relatively blunt end shape of the bob as distinguished from other possible shapes such as one with pointed ends, etc., is important to insure thorough circulation of the cement in the cavity as the bob goes up and down, and to therefore prevent hardening of the cement leading to erroneous results.

From the foregoing detailed general description of the mechanical aspects of the device, it will be appreciated that there are several factors involved in the design of the viscometer of the present invention and related to its operation. However, most of the improvements which have been made on the viscometer of my prior application are in the electronic circuitry employed with the cell, which circuitry will be discussed hereinafter.

The top surface 13 and the bottom surface 14 of the cavity 9 of the container are sound-responsive in nature, that is, they generate and transmit sound whenever they are struck by the top or bottom, respectively, of the bob or iron plunger 11. The sound waves so emanating from either or both of said surfaces may be picked up by the transducer 23. Sounds will be generated only when the bob or iron plunger 11 is in motion and strikes either of the aforementioned surfaces. This motion of the iron plunger is caused by the electromagnetic fields provided by the top and bottom coils 27 and 28. By intermittently and regularly electrically energizing each of these coils at a given frequency/time level, it is possible that the "drag" exerted by the fluid placed in the container may be or become so great that the bob cannot reach a particular striking surface of the cavity during a given time limit in the cycle. This failure to reach a striking surface may be made a function of a measured calibrated viscosity, so that when such failure occurs, the operator then knows that the fluid has reached a predetermined viscosity level. These predetermined viscosity levels and where they occur, such as at 20 and 70 poises, etc., are discussed more fully hereinbefore. Or optionally, and as preferred in the present invention, only the sound caused by the bob striking the top surface of the cavity may be used to actuate an electronic circuit, and the viscosity of the material placed within the test cell may be continuously or instantaneously measured or recorded, based upon the time required for the bob to travel through the material under test; such as by means of a pen and calibrated paper chart revolving at a speed of 3 inches per hour, the chart being set to register a viscosity of zero using water as a standard and the test being terminated when the pen reaches the 70 line on the chart, or it can be continued to the extreme edge of the paper.

It will be noticed that the aforedescribed system is one which provides for easy cleaning after any particular fluid is tested, usually by backing off seal nut 7 a few turns, removing the thermometer wires 10A, closing the valve handle 24, then uncoupling pressure line 16, removing the cell from the container, and then disconnecting the thermowell and the valve block 15. The oil remaining in the pressure inlet stem 4 is then poured off, seal nut 7 is backed off to the extreme end of the threads of said stem and top plug 2 is then unscrewed until free. These parts are then removed from the cell which may then be inverted and bumped against a wooden block or other resilient surface to free the bob. A water jet will then usually suffice to clean remaining cement from the sample cavity, although other suitable solvents may also be employed. The bottom corners of the cell, Teflon gaskets and pressure inlet stem may usually be cleaned in a similar manner, but sometimes being assisted by auxiliary means such as a screwdriver for the bottom corners or wooden tools for the gaskets, etc. It will also be noticed that in addition to the ease of filling and cleaning, the system is one in which the desired pressures can easily be obtained. The temperature within the container can similarly be easily altered, as will be more fully apparent after the remaining drawings have been described.

Figure 3A:
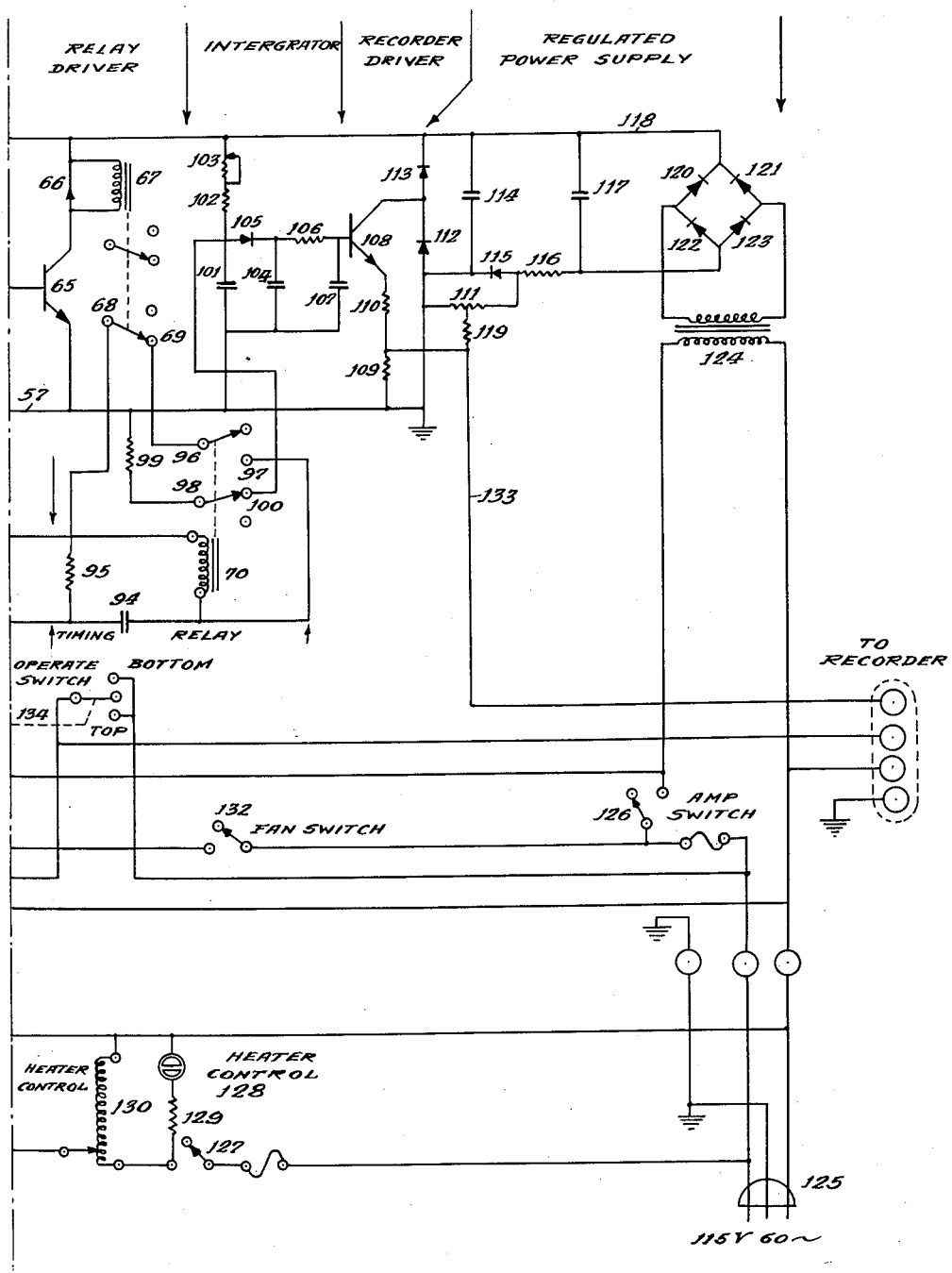

Referring now to the associated electrical elements and other parts of the apparatus as shown in FIGURES 3 and 3A:

The transducer 23 converts the mechanical sounds made by the bob 11 striking the upper surface 13 into electrical signals. A ten ohm resistor 21 is in parallel with the transducer to increase damping and reduce sensitivity. The transformer 33 serves as an impedance matching device between the transducer 23 and the input of the amplifier circuit. The primary of this transformer is balanced and the center-tap grounded to reduce electrostatic and electromagnetic pickup in the transducer and connecting cable to the cell. The transistors 34 and 35 (which are 2N35's), together with their associated components, form a conventional two-stage class A amplifier. Resistors 36 and 37, which are each 330,000 ohms, are for bias stabilization. Resistors 38 and 39, each 27,000 ohms, are load resistors for the transistors. Capacitor 22 is 100 microfarads. Blocking capacitors 40 and 41, having values of 0.1 and 3 microfarads respectively, are small enough to attenuate signals lower than the design frequency center. The design frequency center is the fundamental frequency in cycles per second of the signals of major interest. Signals of higher or lower frequency than those of major interest are attenuated. Resistor 43 (3,300 ohms) serves to maintain a constant supply voltage for the two amplifier stages and also to decouple the amplifier stages from other circuitry.

The combination of capacitors 44 and 45, having capacities of 5.0 and 0.25 microfarads respectively, resistors 46 and 47 (each of 100,000 ohms), and diode 48 (a 1N294) form a differentiator or rectifier circuit which converts any continuous signal such as mechanical vibration, electrical interference or noise into a D.C. signal across capacitor 45. This D.C. signal is blocked from the subsequent circuitry by capacitor 49 (5 microfarads). Capacitor 44 is much larger than capacitor 45 so that the maximum of any signal at the collector junction 50 of transistor 35 (2N35) will appear across capacitor 45. The resultant capacity of capacitor 44 and capacitor 45, in series through diode 48, is large enough to attenuate high frequency signals above the design frequency center.

Transistors 51 and 52 (2N35's) together with their associated components form a monostable multivibrator. Transistor 53 (also a 2N35) is used to trigger the multivibrator. This stage of the electronic circuit also serves to shape the wave of the desired signal received from the differentiator circuit. In the stable state transistor 52 is saturated due to the current drawn through the base junction by resistor 54 (27,000 ohms) being returned to the supply voltage. The saturation current through the collector of transistor 52 and load resistor 55 (4,700 ohms) cause the voltage at point 56 to be very nearly zero with respect to the common ground 57. The base of transistor 51 is tied to junction 56 through resistor 58 (33,000 ohms). Therefore very little collector current is flowing through transistor 51 and resistor 59 (3,300 ohms) and the voltage at the junction 60 of these two is very nearly equal to the supply voltage at 61. Transistor 53 contributes very little to the total current through resistor 59 (3,300 ohms) because the base connection is not returned to any fixed D.C. reference voltage. Capacitor 42 and resistor 64 (3,300 ohms) function to decouple this circuit from other circuitry.

When a discontinuous signal from the transducer appears at the junction of capacitors 45 and 49, it will pass to the base of transistor 53 causing collector current to flow through transistor 53 and resistor 59. This causes the voltage at junction 60 to decrease. As the voltage across the capacitor 62 (2.2 microfarads) cannot change instantaneously, the voltage at the junction of resistor 54, and the base connection of transistor 52 decreases, thus decreasing the collector current of transistor 52 through resistor 55. This of course increases the voltage at junction 56, and as junction 56 is connected to the base of transistor 51 through resistor 58, more collector current will flow through transistor 51 and resistor 59, further reducing the voltage at junction 60. This action is regenerative and will continue until transistor 51 is saturated and transistor 52 is cut off. The circuit will stay in this state until the charge across capacitor 62 has been reduced by leakage through resistor 54 to the point where transistor 52 can start conduction. At this point the regenerative action is reversed and the circuit is returned to its original stable state.

During the cycle of operation there appears at junction 56 a rectangular pulse of constant amplitude and constant width. The amplitude is held by maintaining the supply voltage constant with resistor 64 (3,300 ohms), and the width is determined by the time constant of capacitor 62 and resistor 54. This rectangular wave form will appear at junction 56 once for every discontinuous signal generated by the transducer when the time interval between signals is greater than the pulse width.

When the rectangular pulse appears at junction 56, it also appears at one end of resistor 63 (18,000 ohms), the other end of which is connected to the base connection of transistor 65 (a 2N1564). This causes relatively heavy surge current to flow through transistor 65 and relay 67, causing relay 67 to operate opening its contacts 68 and 69, and breaking the holding current circuit to the timing relay 70, causing it to open. Diode 66 (a TI2070) is a surge suppressor for relay 67 to protect transistor 65.

In operation, the current into the electromagnet coils 27 and 28 is switched alternately between the top and bottom coils, for one second each, by the timing motor 71 and cam 72 and the microswitch 73. Diodes 74 and 75, both 1N1125R's, capacitors 76 and 77 both of 20 microfarad capacity, and resistor 78 (50 ohms) form a surge suppressor circuit to prevent arcing of switch 73 during switching. The current is adjusted to a predetermined level by the adjustable transformer 79 of the electromagnet current control circuit. The current level required is determined by adding a standard weight to the top of the "bob" 11 by means of a long brass rod through the pressure inlet stem 4 with the weight affixed to the top, outside the assembly. The voltage to the rectifier bridge of the electromagnet power supply and switching circuit is increased by adjusting the transformer 79 until the bob rises to the top of the sample cavity. Meter 80 of the electromagnet current indicator circuit is adjusted to read midscale for this value. This is accomplished by selection of the proper value for resistor 81. The setting of transformer 79 will be adjusted through the run in order to keep meter 80 at a constant reading of approximately 50 microamperes. This will have to be adjusted from time to time because of the considerable heat generated by the electromagnetic coils 27 and 28 as they warm up.

Two of the diodes 82 and 83 of the rectifier bridge of the electromagnet power supply and switching circuit are 1N1125R's and two, 84 and 85, are 1N1125's. The capacitor 86 of this bridge is of 150 microfarads. The diodes 87, 88, and 89 and 90 of the rectifier bridge of the electromagnet current indicator circuit are TI2070's or Hoffman HB-2's. Resistor 91 is of 5 ohms and functions to furnish a suitable voltage drop for meter 80 and associated circuitry. Resistor 92 is of 39,000 ohms and functions to provide proper time constant for charging capacitor 93. Capacitor 93 is of 20 microfarads. The meter 80 may typically have a range between 0 and 100 microamperes and for mid scale reading, resistor 81 will typically be about 100,000 ohms.

When the top electromagnet coil 27 is energized by switch 73, capacitor 94 (1 microfarad) of the timing relay circuit, will charge through the coil of relay 70 and the relay will close. It is held in the closed position by the current through resistor 95 (18,000 ohms) by means of contacts 68 and 69 of relay 67 and contacts 96 and 97 of relay 70. If relay 67 does not operate, relay 70 will remain closed for the one second duration of the time the top electromagnet is energized. If however, a signal is received by the amplifier section during the time relay 70 is closed (and this signal is differentiated and formed into a rectangular pulse, etc., as previously described) relay 67 will be caused to operate opening its contacts 68 and 69, breaking the holding current circuit to relay 70, causing it to open. Relay 67 will close only during the presence of a signal but when it opens, the current through resistor 95 and the coil of relay 70 is insufficient to cause relay 70 to close again.

Summarizing then, relay 70 closes each time the top electromagnet 27 is energized and remains closed until the bob 11 strokes the top 13 of the sample cavity. The signal picked up and generated in the microphone or transducer 23 is amplified and shaped to operate relay 67, which in turn causes relay 70 to open. Therefore, relay 70 is closed only during the time it takes the bob to travel from the bottom of the sample cavity to the top.

Contact 98 of relay 70 is connected through a 100 ohm resistor 99 to ground and contact 100 to the junction of capacitor 101 (100 microfarads) and resistor 102 (24,000 ohms) in the integrator circuit. During the time relay 70 is open the charge on capacitor 101 is essentially zero. When relay 70 is closed, the 100 ohm resistor 99 is removed, capacitor 101 starts charging toward the applied voltage through resistor 102 and adjustable resistor 103, which has a maximum resistance of 25,000 ohms. The values of capacitor 101, and resistors 102, and 103 are such that only the acceptably linear portion of the exponential RC curve is used. Capacitor 104 (also of 100 microfarads) will also charge during this time through the low forward resistance of diode 105, (a 1N2070). When relay 70 opens, capacitor 101 is discharged through resistor 99. Capacitor 104 will not be discharged due to the high back resistance of diode 105. After a few cycles the charge on capacitor 104 is proportional to the time that relay 70 is closed and hence in operation, proportional to the average time that is required to move the bob from bottom to top in the slurry sample. Resistor 106 (150,000 ohms) and capacitor 104 is present a smooth driving current to transistor 108 (a T1492) of the recorder driver circuit.

The recorder is located at a remote point but is electrically in parallel with thermistor 109, which is a VECO 25D4 and which serves as temperature compensation for the one hundred ohms, one milliampere movement of the recorder. The thermistor 109 decreases in resistance with increases in temperature. It is physically close to transistor 108 to compensate for current increases in transistor 108 with increases in temperature thus keeping the current through the recorder constant (for a given signal on time interval) with changes in temperature within the instrument. Resistor 110 (1,000 ohms) isolates the transistor 108 from the recorder and the thermistor.

Calibration of the recorder is accomplished as follows: With the equipment operating but the bob removed (or the transducer disconnected or shorted), relay 70 will remain closed for the full one second period during which the top electromagnet is energized. Resistor 103 of the integrator circuit is then adjusted to give full scale deflection of the recorder. The equipment is then returned to normal operating conditions with the bob in place and the transducer and amplifier working, but with the sample cavity filled with water. Variable resistor 111 (1,000 ohms maximum) is then adjusted to give zero deflection of the recorder. This causes a current to flow through the recorder and thermistor in opposition to that from the transistor 108. As the bob has mechanical inertia and a finite time is required to bring the current in the electromagnet up to maximum, this adjustment is necessary to make the recorder deflection proportional to the slurry sample consistency.

The recorder driver circuit is comprised of a series of components which are designed to assist in providing a proper output to the recorder, and at the same time to be efficiently coupled to a regulated power supply system for the entire electrical circuitry. The collector of transistor 108 is connected between diodes 112 and 113 (which diodes are constant voltage zener regulators SV-18's). Capacitor 114, of 500 microfarads capacity, is connected in parallel across these diodes. Diode 115 (which is a 1N746) is connected between one side of capacitor 114 and one side of resistor 116, having a resistance of 680 ohms. Capacitor 117, having a capacity of 50 microfarads, is connected between the other end of resistor 116 and the output line 118 from the rectifier bridge of the regulated power supply; and resistor 119, having a value of 15,000 ohms, is variably connected to resistor 111. These components not only perform the previously described functions but also serve to modify the output from thermistor 109 and help to smoothly and efficiently effect the calibration of the recorder.

The rectifier bridge of the regulated power supply is comprised of four diodes, 120, 121, 122, and 123, all of which are T1-2070's. The bottom of this bridge is connected to the coupling between resistor 116 and capacitor 117 while the top of same, as previously stated, leads to out line 118. The side connections of the bridge are connected to transformer 124, which may be of a Stancor A-64-C type. This transformer is energized by plugging in electrical connector 125 to an external circuit, which circuit preferably is of the 115 volt— 60 c.p.s. type. The circuit is turned on by closing amp switch 126 and operate switch 134 in order to operate the apparatus in the manner previously described. Wire 133 from the recorder driver circuit is connected to one of the terminals of the recorder in order that the viscosity measurement previously discussed may be charted. One of the terminals of the recorder is also connected to the operate switch 134 and this terminal is also operatively connected to one side of the power line. When the power line is connected by the plugging in of 125 and the amp and operate switches turned on, the recorder will start running and the test commenced.

During the course of operating the instrument it will generally be desirable, as has been previously discussed, to control the temperature of the fluid being tested. This may be effectively carried out by closing the switch 127 to activate heater 26. The lighting of heater indicator 128 (an NE-2), indicates that this has been done. Resistor 129 is of 150,000 ohms and is placed in series with heater indicator 128 for proper limitation of the current flowing through same. Heater-control 130 is provided in order to control the gradualness of the upheating rate.

If the foregoing components are unable to control the temperature of the fluid being tested with sufficient sensitivity to keep its temperature very close to the desired time-pressure-temperature schedule previously described, the fan 131, which is located within the insulated chamber along with the heater, may be turned on by closing the fan switch 132 and this will further modify the upheat rate of the fluid being tested. The fan switch 132 is located on the face of the instrument panel of the apparatus and may therefore be conveniently turned on and off several times during the testing schedule should it be necessary or desirable. Its cooling action may also be supplemented by providing, or forcing, or pumping air through air inlet 19, care being taken not to employ so much air as to impair the mechanical coupling between the pressure cell and the transducer sound pick-up mechanism.

The circuit may also be conveniently provided with electrical jacks or studs, and slots for same, as depicted by the circles in the drawing, for ease in making desired electrical connections. Fuses are or may be provided whenever necessary to safeguard against current overloads.

Although I have described my invention in considerable detail, it is understood that the present disclosure has been made only by way of example and that numerous changes in the details of construction and the combination and arrangement of parts, such as, for example, in the use of vacuum tubes rather than transistors, may be resorted to without departing from the spirit and the scope of the invention as hereinafter claimed.

I claim:

1. An apparatus useful for measuring the viscosity characteristics of a fluid comprising in combination a substantially non-magnetic container for the fluid; electromagnetic windings surrounding upper and lower portions of a cavity in said container for establishing magnetic fields in said portions of said container; a movable bob having an appreciable viscous drag and being responsive to said fields positioned within said cavity and freely movable in the fluid; means for intermittently and regularly electrically energizing each of said windings whereby said electromagnetically responsive movable bob is caused to move into the resultant magnetic fields; a surface at the top of the cavity of said container which generates and transmits sound waves when struck by said bob; means for converting said sound waves into electrical signals; means for amplifying said electrical signals; means for differentiating and passing said amplified signals while attenuating signals of other frequencies; means for triggering and shaping said differentiated, amplified signals; relay driver means responsive to said shaped signals and capable of opening a timing relay shortly after receiving said signals; integrator means responsive to said timing relay having capacitative means for building up a charge, which charge is proportional to the time said relay is closed, said integrator means also being capable of presenting a smooth output current to the driver of a recorder; recorder driver means responsive to the output from said integrator and capable of transmitting this output to a recorder; and a recorder means coupled to said recorder driver and responsive to same for recording the length of time said time relay is closed and thereby the length of time required for said bob to be pulled through said cavity and strike the top surface of same, said measurement by said recorder optionally being of the viscosity of the fluid rather than a time measurement and accomplished by pre-calibration of the recorder.

2. An apparatus useful for measuring the viscosity characteristics of a fluid whose viscosity changes under different pressure and temperature conditions comprising in combination a substantially non-magnetic container for the fluid; electromagetic windings surrounding upper and lower portions of a cavity in said container for establishing magnetic fields in said portions of said container; a movable bob having an appreciable viscous drag and being responsive to said fields positioned within said cavity and freely movable in the fluid; means for intermittently and regularly electrically energizing each of said windings whereby said electromagnetically responsive movable bob is caused to move into the resultant magnetic fields; a surface at the top of the cavity of said container which generates and transmits sound waves when struck by said bob; means for converting said sound waves into electrical signals; means for amplifying said electrical signals; means for differentiating and passing said amplified signals while attenuating signals of other frequencies; means for triggering and shaping said differentiated, amplified signals; relay driver means responsive to said shaped signals and capable of opening a timing relay shortly after receiving said signals; integrator means responsive to said timing relay having capacitative means for building up a charge, which charge is proportional to the time said relay is closed, said integrator means also being capable of presenting a smooth output current to the driver of a recorder; recorder driver means responsive to the output from said integrator and capable of transmitting this output, which is of a varying nature, to a recorder; and a recorder means coupled to said recorder driver and responsive to same for recording the length of time said time relay is closed and thereby the length of time required for said bob to be pulled through said cavity and strike the top surface of same, said measurement by said recorder optionally being of the viscosity of the fluid rather than a time measurement and accomplished by pre-calibration of the recorder.

3. In an apparatus useful for measuring the viscosity characteristics of a fluid which apparatus is characterized by having a substantially non-magnetic container for the fluid; electromagnetic windings surrounding upper and lower portions of a cavity in said container for establishing magnetic fields in said portions of said container; a movable bob having an appreciable viscous drag and being responsive to said fields positioned within said cavity and freely movable in the fluid; means for intermittently and regularly electrically energizing each of said windings whereby said electromagnetically responsive movable bob is caused to move into the resultant magnetic fields; a surface at the top of the cavity of said container which generates and transmits sound waves when struck by said bob; means for converting said sound waves into electrical signals; and means for amplifying said electrical signals; the improvement which comprises means for differentiating and passing said amplified signals while attenuating signals of other frequencies; means for triggering and shaping said differentiated, amplified signals; relay driver means responsive to said shaped signals and capable of opening a timing relay shortly after receiving said signals; integrator means responsive to said timing relay having capacitative means for building up a charge, which charge is proportional to the time said relay is closed, said integrator means also being capable of presenting a smooth output current to the driver of a recorder; recorder driver means responsive to the output from said integrator and capable of transmitting this output to a recorder; and a recorder means coupled to said recorder driver and responsive to same for recording the length of time said time relay is closed and thereby the length of time required for said bob to be pulled through said cavity and strike the top surface of same, said measurement by said recorder optionally being of the viscosity of the fluid rather than a time measurement and accomplished by pre-calibration of the recorder.

4. In an apparatus useful for measuring the viscosity characteristics of a fluid whose viscosity changes under different pressure and temperature conditions comprising in combination a substantially non-magnetic container for the fluid; electromagnetic windings surrounding upper and lower portions of a cavity in said container for establishing magnetic fields in said portions of said container; a movable bob having an appreciable viscous drag and being responsive to said fields positioned within said cavity and freely movable in the fluid; means for intermittently and regularly electrically energizing each of said windings whereby said electromagnetically responsive movable bob is caused to move into the resultant magnetic fields; a surface at the top of the cavity of said container which generates and transmits sound waves when struck by said bob; means for converting said sound waves into electrical signals; and means for amplifying said electrical signals; the improvement which comprises means for differentiating and passing said amplified signals while attenuating signals of other frequencies; means for triggering and shaping said differentiated, amplified signals; relay driver means responsive to said shaped signals and capable of opening a timing relay shortly after receiving said signals; integrator means responsive to said timing relay having capacitative means for building up a charge, which charge is proportional to the time said relay is closed, said integrator means also being capable of presenting a smooth output current to the driver of a recorder; recorder driver means responsive to the output from said integrator and capable of transmitting this output, which is of a varying nature, to a recorder; and a recorder means coupled to said recorder driver and responsive to same for recording the length of time said relay is closed and thereby the length of time required for said bob to be pulled through said cavity and strike the top surface of same, said measurement by said recorder optionally being of the viscosity of the fluid rather than a time measurement and accomplished by pre-calibration of the recorder.

5. An improved apparatus according to claim 4 wherein there is provided for said electromagnetic windings means for controlling and measuring the current through same and also surge suppressing means as the current is alternately switched to said windings.

6. In an apparatus useful for measuring viscosity characteristics of a fluid whose viscosity changes under different pressure and temperature conditions comprising a substantially non-magnetic pressure cell for the fluid, internally threaded near its top; electromagnetic winding means for establishing a magnetic field in said cell; a bob having an appreciable viscous drag and being responsive to said field positioned within said cell and freely movable in the fluid; means for intermittently and regularly electrically energizing said winding whereby said electromagnetically responsive movable bob is caused to move into the resultant magnetic field; a closure possessing a hollow cylindrical bore adapted to be threaded into said cell; a cylindrical inlet stem flanged at its base and externally threaded at its upper portion, also possessing a hollow cylindrical bore and adapted for close proximate insertion through the hollow cylindrical bore of said closure; a resilient sealing gasket surrounding said inlet stem and situated between the flange of said stem and the base of said closure; a pressure seal nut adapted to be threaded about said inlet stem and to cause the flange of said stem to pressure the sealing gasket against the bottom of said closure; a valve body threaded onto the top of said inlet stem and forming a pressure-tight seal therewith; pressure input means in said valve body communicating with the hollow cylindrical bore of said inlet stem; a thermowell packing bolt threaded into said valve body forming a pressure-tight seal therewith and having a hollow cylindrical bore therein; a thermowell projecting through said packing bolt, said valve body and said inlet stem into said pressure cell; a surface at the top of the cavity of said container which generates and transmits sound waves when struck by said bob; means for converting said sound waves into electrical signals; and means for amplifying said electrical signals; the improvement which comprises means for differentiating and passing said amplified signals while attenuating signals of other frequencies; means for triggering and shaping said differentiated, amplified signals; relay driver means responsive to said shaped signals and capable of opening a timing relay shortly after receiving said signals; integrator means responsive to said timing relay having capacitative means for building up a charge, which charge is proportional to the time said relay is closed, said integrator means also being capable of presenting a smooth output current to the driver of a recorder; recorder driver means responsive to the output from said integrator and capable of transmitting this output, which is of a varying nature, to a recorder; and a recorder means coupled to said recorder driver and responsive to same for recording the length of time said relay is closed and thereby the length of time required for said bob to be pulled through said cavity and strike the top surface of same, said measurement by said recorder optionally being of the viscosity of the fluid rather than a time measurement and accomplished by pre-calibration of the recorder.

7. An improved apparatus according to claim 6 wherein there is provided for said electromagnetic windings means for controlling and measuring the current through same and also surge suppressing means as the current is alternately switched to said windings.

8. A process for measuring the viscosity characteristics of a fluid which comprises: (1) filling the cavity of a substantially non-magnetic container with the fluid, which cavity is surrounded at its upper and lower portions with electromagnetic windings and which cavity has disposed therein and freely movable in the fluid a bob having an appreciable viscous drag and which is responsive to said electromagnetic fields, and which cavity also possesses a surface at its top which generates and transmits sound waves when struck by said movable bob; (2) intermittently and regularly electrically energizing said upper and lower windings whereby said electromagnetically responsive movable bob is cyclically caused to move upwardly into the resultant upper magnetic field through the fluid toward the upper surface of said cavity when said winding is energized and the lower winding de-energized and, when said upper winding is de-energized and when said lower winding is energized to move downwardly through the fluid toward the lower surface of said container; (3) converting the sound generated at the top surface into electrical signals; (4) amplifying said electrical signals; (5) differentiating and passing said amplified signals while attenuating signals of other frequencies; (6) triggering and shaping said differentiated, amplified signals; (7) channeling said shaped signals to relay driver means responsive to said shaped signals and capable of opening a timing relay shortly after receiving said signals; (8) operatively connecting said timing relay to integrator means responsive to said timing relay having capacitative means whose charge is proportional to the time said relay is closed, said integrator means also being capable of presenting a smooth output current to the driver of a recorder; (9) sending said smooth output current to record driver means responsive to the output from said integrator and capable of transmitting this output to a recorder; and (10) recording by means of a recorder coupled to said recorder driver and responsive to same the length of time said time relay is closed and thereby the length of time required for said bob to be pulled through said cavity and strike the top surface of same, said recording measurement optionally being of the viscosity of the fluid rather than a time measurement and accomplished by pre-calibration of the recorder.

9. A process for measuring the viscosity characteristics of a fluid whose viscosity changes under different pressure and temperature conditions which comprises: (1) filling the cavity of a substantially non-magnetic container with the fluid, which cavity is surrounded at its upper and lower portions with electromagnetic windings and which cavity has disposed therein and freely movable in the fluid a bob having an appreciable viscous drag and which is responsive to said electromagnetic fields, and which cavity also possesses a surface at its top which generates and transmits sound waves when struck by said movable bob; (2) intermittently and regularly electrically energizing said upper and lower windings whereby said electromagnetically responsive movable bob is cyclically caused to move upwardly into the resultant upper magnetic field through the fluid toward the upper surface of said cavity when said winding is energized and the lower winding de-energized and, when said upper winding is de-energized and when said lower winding is energized to move downwardly through the fluid toward the lower surface of said container; (3) converting the sound generated at the top surface into electrical signals; (4) amplifying said electrical signals; (5) differentiating and passing said amplified signals while attenuating signals of other frequencies; (6) triggering and shaping said differentiated, amplified signals; (7) channeling said shaped signals to relay driver means responsive to said shaped signals and capable of opening a timing relay shortly after receiving said signals; (8) operatively connecting said timing relay to integrator means responsive to said timing relay having capacitative means whose charge is proportional to the time said relay is closed, said integrator means also being capable of presenting a smooth output current to the driver of a recorder; (9) sending said smooth output current to recorder driver means responsive to the output from said integrator and capable of transmitting this output, which may be of a varying nature, to a recorder; and (10) recording by means of a recorder coupled to said recorder driver and responsive to same the length of time said time relay is closed and thereby the length of time required for said bob to be pulled through said cavity and strike the top surface of same, said recording measurement optionally being of the viscosity of the fluid rather than a time measurement and accomplished by precalibration of the recorder.

References Cited in the file of this patent

UNITED STATES PATENTS 2,320,218     Buckley _____ May 25, 1943

UNITED STATES PATENT OFFICE
CERTIFICATE OF CORRECTION

Patent No. 3,073,151                                          January 15, 1963

James D. Fann

It is hereby certified that error appears in the above numbered patent requiring correction and that the said Letters Patent should read as corrected below.

Column 3, line 10, for "voscosity" read -- viscosity --; column 9, line 43, for "through" read -- throughout --; column 10, line 36, for "104 is present" read -- 107 (25 microfarads) further integrate the charge on capacitor 104 to present --; column 11, line 19, for "out" read -- out put --; column 15, line 26, for "record" read -- recorder --.

Signed and sealed this 16th day of July 1963.

(SEAL)
Attest:

ERNEST W. SWIDER                                              DAVID L. LADD
Attesting Officer                                            Commissioner of Patents